June 3, 1947.                M. F. NEWMARK                2,421,574
                              TEETHING AID
                           Filed Oct. 8, 1945
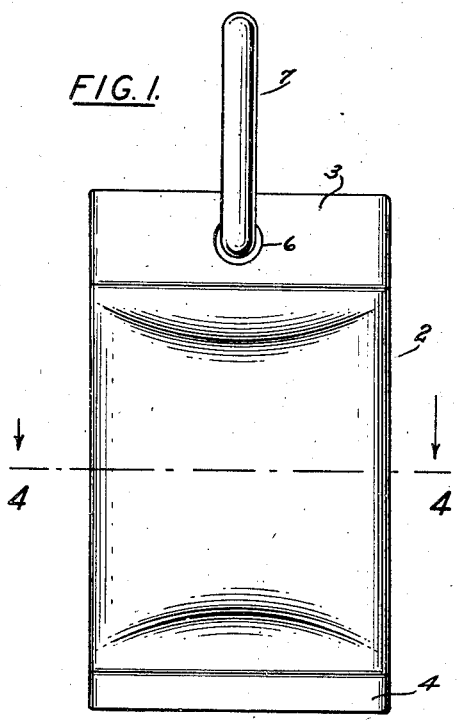
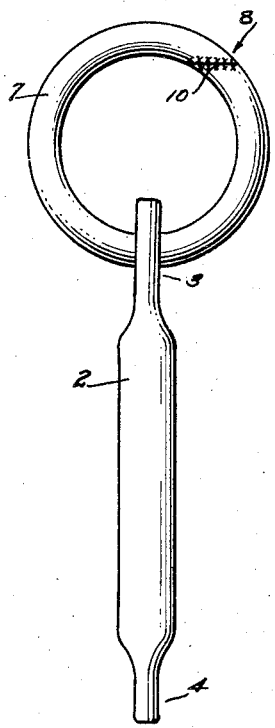
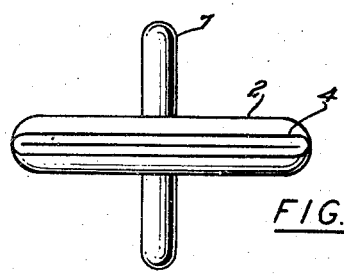
INVENTOR
Marshall F. Newmark
By Scott L. Norviel Patented June 3, 1947

2,421,574

UNITED STATES PATENT OFFICE 2,421,574

TEETHING AID

Marshall F. Newmark, Tucson, Ariz.

Application October 8, 1945, Serial No. 620,928

2 Claims. (Cl. 128—359)

This invention relates to teething aids for infants.

During the teething period, it is noted that the child's gums are sore and feverish. It has long been known that the child instinctively chews or gums available substances that can be entered in the mouth, and teething rings have been known and used for many ages. These are usually made in the shape of a ring for convenience in handling, and are, for the most part, made of a resilient or soft semi-resilient material such as a rubber composition.

The materials heretofore used have, for the most part, the common fault that they cannot be made sufficiently resilient without having an undesired taste, are not adequately resistant to wear; and cannot be boiled for sterilization without causing deterioration.

I have found that the quality of a teething aid can be improved by the use of certain plastic compositions having some of the resilient properties of natural rubber, but having greater resistance to wear or abrasion, lack of odor or taste, and the ability to stand boiling or freezing temperatures without deterioration or loss of resilience.

In view of the foregoing, one of the objects of my invention is to provide a teething aid composed of a tough resilient substance which may be repeatedly sterilized by boiling without deterioration and which may be reduced to a temperature below the freezing point of water without loss of its resilient properties;

A second object is to provide a teething aid made of a substance as above mentioned in a form of a flat hollow pack which may be filled with a freezable liquid whereby it will remain cold for a period of time and until the liquid thaws, and A third object is to provide a teething aid as aforesaid with a convenient ring handle which also serves as an additional teething ring.

Other objects will appear hereinafter.

I attain these objects by means of the composition hereinafter explained, and the structure shown in the accompanying drawings, in which—

Figure 1 is a plan view of the device;

Figure 2, a side view thereof;

Figure 3, an end view thereof; and

Figure 4, a sectional view taken on line 4—4, Figure 1.

Similiar numerals refer to similar parts in the several views.

Referring to the drawing, 2 represents a hollow flattened tubular case made of plastic material, which is sealed at each end as indicated by numerals 3 and 4.

The interior of the case is filled with distilled sterile water indicated by numeral 5.

The end 3 is pierced by a hole 6, and through this a ring 7 is inserted and welded at 8 to form a solid structure. This ring may be made of solid plastic material or it may be made hollow, filled with air, water, or other liquids as desired. This ring forms a handle for easy handling or hanging of the device if desired, and may also act as a teething ring.

The case or pack may be made of any convenient size but is preferably about two and one half inches long, one inch wide, and three-eighths of an inch thick.

To secure the physical qualities desired, and as above stated, for making the device I select from the class of materials known as plastics, a substance having a normal resilient texture, somewhat firmer than rubber, normally colorless, and not affected, so far as these qualities are concerned, by temperatures varying from 250° F. to 20° F. but having thermoplastic welding qualities at temperatures above the higher heat mentioned. Such a substance is, for example, a vynyl polymer such as the co-polymer of, vynyl chloride (about 95%) and vynyl acetate about 5%) which may be plasticized with either dioctyl phthalate, or tricresyl phosphate.

A tube of this material is welded together flat by heat at one end and the hole 6 punched out, a quantity of distilled sterile water is then placed in the pocket formed in this way and the other open end gripped shut somewhat below the end and leaving enough material beyond the gripping elements for welding. Heat, to secure welding, is then applied along the protruding edge of this end. The ring 7 is then formed from a rod of this same material, inserted through hole 6, and the ends welded on an angle cut as indicated by numeral 10.

In use, the device is first sterilized by immersion in boiling water, cooled and then placed in the freezing compartment of an electric refrigerator. When the water 5 is frozen, the device is ready for use as a teething aid.

Obviously, both the plastic and the water may be colored, if desired, to add to the attractiveness of the device.

While I have described my invention specifically, it is obvious that many changes may be made without altering the general structure, and the device, so changed, would still remain within the spirit of my invention; therefore, I wish to be limited only by the following claims:

I claim:

1. A teething aid for infants, composed of a resilient plastic material resistant to abrasion and unaffected by contact with boiling water and freezing water composed of a flattened tubular body, welded shut at each end to provide a hollow interior, said interior being filled with water; one of the welded ends of said body being pierced to receive a ring, together with a ring of resilient plastic material resistant to abrasion and the temperatures of boiling and freezing water.

2. A teething aid for infants composed of the plasticized co-polymer of vynyl chloride and vynyl acetate formed into a flattened tubular hollow body, closed at each end by flattened welded portions, together with a ring of the plastic co-polymer of vynyl chloride and vynyl acetate inserted through an opening in one of said end portions of said body.

MARSHALL F. NEWMARK.

REFERENCES CITED

The following references are of record in the file of this patent:

UNITED STATES PATENTS

| Number | Name | Date |
|---|---|---|
| 2,112,316 | Turner | Mar. 29, 1938 |
| 1,656,833 | Schutze | Jan. 17, 1928 |
| 2,383,230 | Voke | Aug. 21, 1945 |